United States Patent [19]

Pohland et al.

[11] Patent Number: 4,512,959
[45] Date of Patent: Apr. 23, 1985

[54] METHOD FOR THE RECOVERY OF ALUMINA

[75] Inventors: Horst Pohland, Limburgerhof, Fed. Rep. of Germany; Arthur J. Tielens, Zurich, Switzerland

[73] Assignee: Alcoa Chemie GmbH, Ludwigshafen, Fed. Rep. of Germany

[21] Appl. No.: 506,402

[22] Filed: Jun. 21, 1983

[30] Foreign Application Priority Data

Sep. 2, 1982 [EP] European Pat. Off. ....... 82 108086.8

[51] Int. Cl.$^3$ ............................................. C01F 7/06
[52] U.S. Cl. ................................. 423/121; 423/127; 23/301; 23/305 A
[58] Field of Search ............... 423/119, 121, 127, 131; 23/301, 305 A

[56] References Cited

U.S. PATENT DOCUMENTS

| | | | |
|---|---|---|---|
| 2,707,669 | 5/1955 | Houston et al. | 423/119 |
| 4,234,559 | 11/1980 | Tschamper | 423/121 |
| 4,305,913 | 12/1981 | Anjier | 423/121 |
| 4,311,486 | 1/1982 | Yamada et al. | 423/121 |
| 4,364,919 | 12/1982 | Yamada et al. | 423/121 |

FOREIGN PATENT DOCUMENTS 1098284  3/1981  Canada .

Primary Examiner—Herbert T. Carter
Attorney, Agent, or Firm—Sughrue, Mion, Zinn, Macpeak, and Seas

[57] ABSTRACT

Process for recovering coarsely crystalline alumina hydrate from bauxite according to the Bayer process wherein, in the presence of fine seed crystals, agglomerates are initially formed in a supersaturated sodium aluminate solution at 80° to 65° C. The agglomerates are then conducted through a first cascade of crystallizers and, after cooling to 55° to 45° C., through a second crystalizer cascade. A crystal suspension is extracted from the last crystallizer of the second crystallizer cascade and fractionated into fine seed crystals and coarse product crystals.

25 Claims, 2 Drawing Figures ature to solve the problems of the Bayer process and

METHOD FOR THE RECOVERY OF ALUMINA

BACKGROUND OF THE INVENTION

The present invention relates to an improved method for the production of alumina hydrate from bauxite according to the Bayer method wherein the properties of the coarse alumina hydrate crystals as well as the yield, with respect to time, are improved. Also, the quantity of seed crystals required for the precipitation of a defined quantity of alumina hydrate can be reduced.

It is known that in the European Bayer process, ground bauxite is heated in an autoclave together with a circulating liquor containing sodium hydroxide and sodium aluminate, whereby alumina goes into solution and red mud remains in undissolved form. The decomposition liquor leaving the autoclave is diluted with wash liquor and/or stirred-out sodium aluminate liquor and the red mud is separated from the liquor. After cooling and inoculation with aluminum hydrate crystals, the alumina hydrate is separated from the separated liquor at temperatures from 50° to 70° C.

A significant feature of this European process is that a concentrated sodium hydroxide solution, having a sodium hydroxide concentration of 280 to 450 g/l, calculated as $Na_2CO_3$, is used for the decomposition and, after dilution, the resulting aluminum oxide hydrate is stirred out at lower temperatures. An aluminum oxide hydrate stirred out under these conditions appears in finely crystalline form. Part of this product is calcined to alumina and another part is used for the inoculation. Due to considerable dust losses during calcination, transport and electrolysis, such a product is undesirable today. Moreover, the fine grained aluminum oxide only poorly absorbs the fluorine gas developed during electrolysis while coarse grained aluminum oxide is well able to do so. The result of the latter is that fluorine gas losses are reduced and considerably less fluorine gas is transferred to the atmosphere which facilitates compliance with increasingly stricter environmental protection regulations. Additionally, in various fields, e.g. utilization as grinding agent and catalyst, the use of coarsely crystalline aluminum oxide is preferred in many cases.

In contrast thereto is the American Bayer process in which sodium hydroxide in the decomposition liquor is concentrated at about 160 to 225 g/l, calculated as $Na_2CO_3$, which is considerably below the concentration in the European decomposition liquors. In this process, however, aluminum oxide hydrates result which have different grain sizes, with the coarse crystals being extracted as product and calcined while the fine and medium coarse crystals are used as seed crystals.

Due to the different types of bauxite decomposed in the above-described variations of the Bayer process, the American Bayer process cannot easily be transferred to bauxites processed in Europe.

Moreover, the American process operates with diluted liquors to produce aluminum oxide hydrates with different grain sizes, which has the drawback that liquor productivity is poorer than if a concentrated liquor were used. With a diluted liquor, more liquid must be processed and turned over than with a concentrated liquor which results in a correspondingly larger requirement for apparatus and higher manufacturing costs and which also requires more energy.

There thus arises the problem of eliminating the above-described drawbacks of the Bayer process and finding a process which permits the production of coarse grained aluminum oxide hydrate, also in more concentrated mother liquors.

To solve this problem, Canadian Pat. No. 1,098,284 proposes to produce product crystals and seed crystals under different conditions in different stirrers. Thus, in a product cascade, essentially coarsely crystalline alumina hydrate is to be produced with continuous parallel supply of fresh (not yet stirred out) supersaturated mother liquor into the individual stirrers in the presence of medium coarse seed crystals, and in an inoculation cascade, finely crystalline alumina hydrate is to be produced from the parallel extracted overflows of the product cascade. The inoculation material and the aluminum oxide hydrate formed while passing through the product cascade are conducted in series through the stirrers of the cascade. The significant feature of this process is that in the product cascade, high solids concentrations (solids-aluminum hydroxide) are present in highly supersaturated sodium aluminate liquors and the process takes place at temperatures from 75° to 90° C. Under these conditions, crystal enlargement is predominant due to crystal growth, while nucleation and seed crystal formation are repressed. In contradistinction thereto, the inoculation cascade operates at temperatures from 50° to 65° C. and the formation of finely crystalline aluminum oxide hydrate in partially stirred-out sodium aluminate liquors is enhanced.

In the prior art Canadian process, the supersaturated mother liquor yields coarsely crystalline aluminum oxide hydrate in amounts from 72 to 85 g/l, expressed as $Al_2O_3$ per $m^3$ of liquor circulated. The product contains no more than 1% crystals of a size smaller than 45 microns.

The sodium hydroxide contained in the supersaturated sodium aluminate liquor of the prior art Canadian process is present in quantities from 200 to 300 g/l, particularly 240 g/l, calculated as $Na_2CO_3$.

A further feature of the process according to Canadian Pat. No. 1,098,284 is that the product cascade operates with three-phase stirrers. In such stirrers, the lowermost phase I constitutes a settling zone with high solids content (40 to 65%), the middle zone II constitutes the stir-out zone with a solids content of 10 to 20%, and the upper zone III, which has a solids content of 1 to 5%, is a clarification zone. Although separation into phases, which can be realized without difficulty with the aid of the stirring device disclosed in that patent, leads to the formation of coarsely crystalline aluminum oxide hydrate in concentrated sodium aluminate liquors (the NaOH content is higher than in the American process and is at approximately the same level as in the European Bayer process), it has been found that the improved liquor productivity is not sufficient to solve the problem at hand. Stirring times of at least 50 hours are often considered too long in practice. In particular, it has been observed that the coarse hydrate crystals produced according to the cited Canadian prior art process are less stable and break easily, in many cases already in the fluidized bed of the calcining furnace.

SUMMARY OF THE PRESENT INVENTION

It is a primary object of the present invention to produce coarse aluminum oxide hydrate crystals which are substantially stable against the attack of mechanical forces and are resistant under stress, for example during transport.

A further object of the present invention is to shorten the stirring time and to improve liquor productivity.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

The solution of the above problems is based on the realization that the mechanical properties of coarse aluminum oxide hydrate crystals are influenced to a great degree by the conditions under which crystal enlargement takes place. It has been convincingly demonstrated that aluminum oxide hydrate crystals, which were produced primarily by crystal growth, have different properties than crystals formed primarily by agglomeration or agglomeration and crystal growth. Aluminum oxide hydrate particles formed only by crystal growth break easily and are obtained in the process according to Canadian Pat. No. 1,098,284. Crystals formed by agglomeration of seed crystals and subsequent crystal growth, are much more stable.

The novel process of the present invention for producing coarse grained and stable alumina hydrate crystals is a continuous process for the extraction of alumina hydrate from bauxite according to the Bayer process wherein a supersaturated sodium aluminate solution containing dissolved alumina hydrate is formed by wet decomposition of ground bauxite with sodium hydroxide and alumina hydrate is precipitated from the supersaturated sodium aluminate solution in coarse grained form in the presence of seed crystals, and comprises:

(a) introducing a suspension of fine seed crystals into the first agglomerator of a cascade of series connected agglomerators, conducting a supersaturated sodium aluminate solution, having a sodium hydroxide concentration of 200 to 300 g/l, calculated as $Na_2CO_3$, through the cascade of series connected agglomerators at temperatures from 80° to 65° C. and precipitating part of the dissolved alumina hydrate to form agglomerates, with the first agglomerator having a solids content of 10 to 50 g/l, calculated as $Al_2O_3$;

(b) thereafter conducting the sodium aluminate solution containing agglomerates through a first cascade of series connected crystallizers, with each crystallizer having an underflow and an overflow, and precipitating part of the dissolved aluminum oxide as aluminum oxide hydrate in such a manner that at least 80% of the fill volume of each crystallizer has a high solids content and the overflow, which comes from the clarification zone, has a solids content of no more that 20 g/l, with underflow and overflow being introduced into the next crystallizer only after being mixed together;

(c) combining the underflow and overflow from the last crystallizer of the first crystallizer cascade to form a combined discharge and cooling the combined discharge to a temperature between 55° C. and 45° C.;

(d) precipitating the cooled combined discharge in a second cascade of series connected crystallizers, with each crystallizer having and underflow and an overflow, in such a manner that at least 80% of the fill volume of each crystallizer of the second cascade has a high solids content and the overflow, which comes from the clarification zone, has a solids content of no more than 20 g/l; and (e) withdrawing and combining the underflow and overflow of the last crystallizer of the second crystallizer cascade into a crystal suspension, and fractionating the withdrawn crystal suspension into fine seed crystals and coarse product crystals.

Preferably, the overflow of the clarification zone of each crystallizer of the first cascade has a solids content of no more than 3 g/l. It is also preferred that the overflow of the clarification zone of each crystallizer of the second cascade has a solids content of no more than 3 g/l. It is further preferred to fractionate the discharged crystal suspension into medium coarse seed crystals.

According to another embodiment of the present invention, the crystallizers of the first crystallizer cascade are standard-precipitators, known in the alumina industry. In such case the precipitators form the first cascade of series connected crystallizers of the novel process, with each precipitator having an overflow by gravity. The sodium aluminate solution containing agglomerates is conducted through the cascade of precipitators, whereby in each precipitator a part of the dissolved alumina hydrate is precipitated. The solids of each precipitator are homogeneously mixed.

In the precipitators there occurs exclusively an enlargement by way of crystal growth of the agglomerate particles formed in the agglomerator cascade. Addition of seed crystals in the "precipitator-cascade" may be expedient.

It is to be understood that both the foregoing general description and the following detailed description are exemplary and explanatory, but are not restrictive of the invention.

DETAILED DESCRIPTION OF THE PRESENT INVENTION

Figure 1:
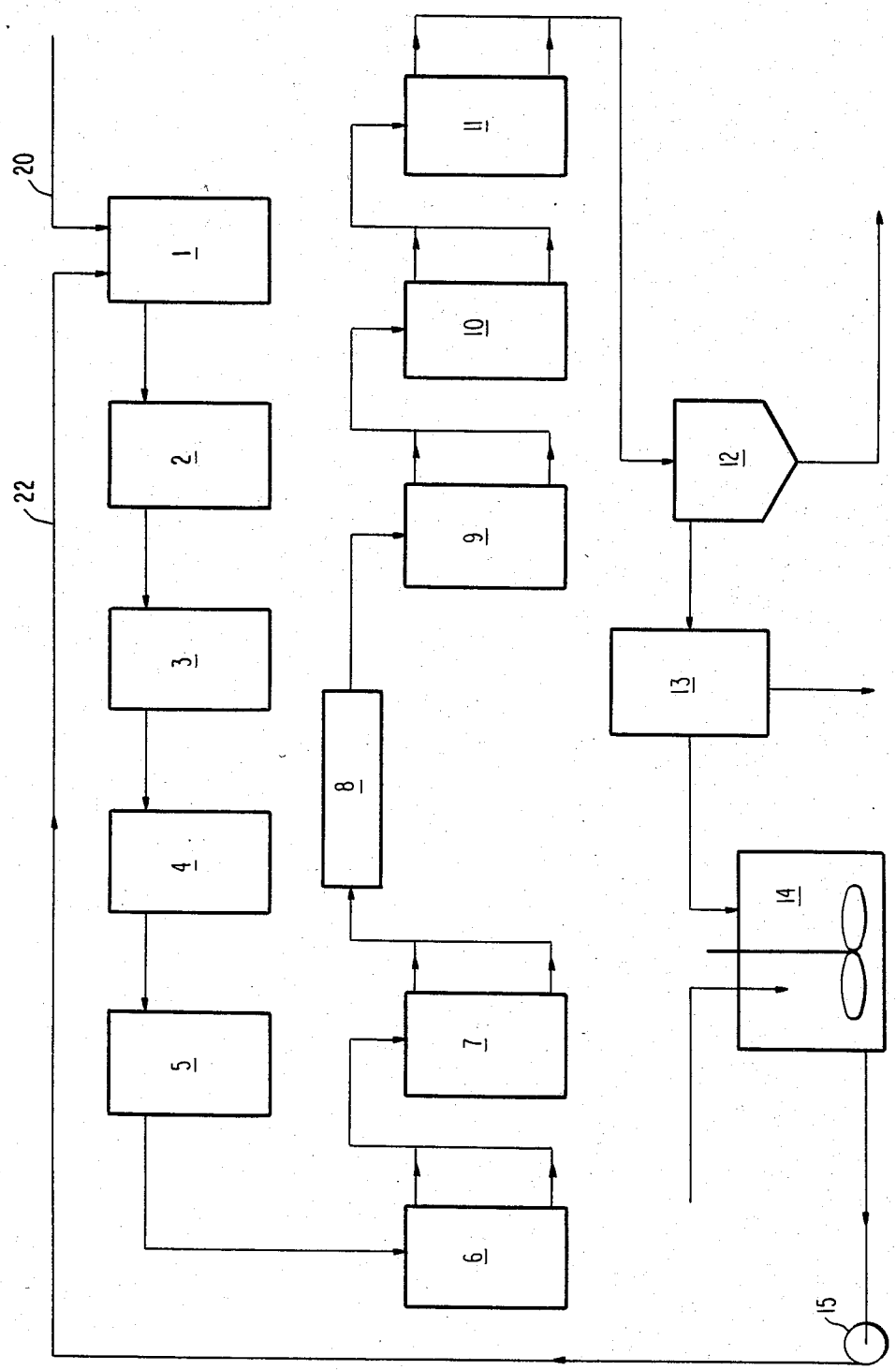
FIG. 1 is a flow scheme for one embodiment of the processing according to the present invention for producing stable and simultaneously coarse aluminum oxide hydrate crystals.

The agglomerators which can be used in the practice of the present invention are stanard stirrers known in the alumina industry. At temperatures betweem 80° and 65° C., preferably between 78° and 75° C., primarily agglomerate formation takes place in the presence of finely crystalline inoculation material and with an A/C ratio of about 0.700 to 0.650. As used herein the A/C ratio is understood to mean the ratio of dissolved aluminum oxide in grams per liter to dissolved sodium hydroxide in grams per liter, calculated as $Na_2CO_2$. Preferably the A/C ratio is 0.690 to 0.660 in the first agglomerator and 0.550 to 0.450, most preferably 0.500 to 0.490, in the last agglomerator.

The size of the seed crystal particles added in the first agglomerator should be such that 25 to 60% of the particles, preferably 35 to 45%, are below 45 microns. It must be pointed out that the seed crystal quantity is very small, i.e. 10 to 50 g/l, preferably 15 to 25 g/l, calculated as $Al_2O_3$. The seed crystal quantity does not include the nucleation material formed in the first agglomerator. It has been found that the quantity of seed crystals present in the first agglomerator of the agglomerator cascade must not be greater than about 50 g/l, calculated as $Al_2O_3$ or about 80 g/l, calculated as hydrate. If larger quantities are present, crystal growth will predominate and agglomerate formation practically comes to a standstill.

The concentration of sodium hydroxide in the sodium aluminate solution at the beginning and end of the agglomerator cascade is 200 to 300 g/l, preferably 240 to 250 g/l, calculated as $Na_2CO_3$. The period of dwell in the agglomerator cascade may be 6 to 10 hours, but is preferably 7.5 to 8.5 hours. Under the stated conditions, almost exclusively agglomerate formation takes place in the agglomerators.

A significant feature of the novel process of the present invention is further that sodium oxalate crystals practically must not be present in the liquor. Oxalate crystals enhance nucleus formation and interfere with agglomerate formation. According to a screen analysis, the end product of the agglomerator cascade includes 80 to 90% particles that are larger than 45 microns.

According to the present invention, the sodium aluminate liquor is partially precipitated in each crystallizer of the next following cascade, referred to herein as the first crystallizer cascade, so that at least 80 volume percent, preferably 85 to 90 volume percent, of the fill volume of each crystallizer of the first crystallizer cascade exhibit a high solids content, which is removed as underflow, and the overflow of each crystallizer, which comes from the remaining fill volume, has a solids content of no more than 20 g/l, calculated as $Al_2O_3$. It is of particular advantage to operate in such a manner that the overflow of each crystallizer of the first crystallizer cascade contains solids of no more than 3 g/l.

One characteristic of this process step is that in the crystallizers there occurs exclusively an enlargement by way of crystal growth of the agglomerate particles formed in the agglomerator cascade. It may be expedient, however, to add seed crystals in the first crystallizer cascade in order to maintain a constant crystal formation equilibrium. If medium coarse seed crystals are added in the first crystallizer, their quantity should be between 100 and 300 g/l, preferably between 150 and 170 g/l, calculated as aluminum oxide. When adding medium coarse seed crystals to the first crystallizer, 70 to 90%, preferably 78 to 83%, of the seed crystals should be greater than 45 microns. In this embodiment of the present invention, the fractionation preferably takes place in decanters, and the decanters are advisably designed in such a manner that the entire medium coarse crystal fraction is used as inoculation material in the first crystallizer cascade, also referred to herein as the second hot cascade, and the fine crystal fraction is used as the inoculation material in the agglomerator cascade.

If the first crystallizer cascade operates at temperatures from 70° to 69° C. in the first crystallizer and at 68° to 62° C., preferably 65° C., in the last crystallizer, periods of dwell of 7 to 14 hours, preferably 8 to 10 hours, are required for passage through the first crystallizer cascade. The higher the temperature and the degree of supersaturation in this first crystallizer cascade, the greater is the crystallization speed.

The agglomerator cascade and first crystallizer cascade can therefore also be called hot cascades, as a distinction from the second crystallizer cascade. For the already mentioned reason, sodium oxalate crystals should practically not be present here as well. Neither nuclea on nor agglomeration but highly crystallization is intended to occur in the first crystallizer cascade.

In the lower part i.e. 80–85% by volume of the crystallizers of the first crystallizer cascade, the aluminum oxide hydrate concentration should be high. It may be between 150 and 450 g/l, expressed as aluminium oxide hydrate. Agglomeration can best be prevented if the lower phase, the "solids bed", takes up a large amount of space and has a high solids content. According to the present invention, the "solids bed" takes up about 80 to 85% by volume of the fill volume. The A/C ratio, which at the point of entry into the first crystallizer cascade is between 0.550 and 0.450, preferably between 0.500 and 0.490, is reduced at the point of exit from the last crystallizer of the first crystallizer cascade to between 0.430 and 0.380, preferably 0.420. The solids content in at least 80 volume percent of the suspension in the crystallizer of the first crystallizer cascade is preferably 230–260 g/l, expressed as aluminum oxide hydrate.

The total solid discharge quantity (underflow and overflow) from the last crystallizer of the first crystallizer cascade, is equal to the solid quantity that flows into the first crystallizer, to which is added the aluminum oxide hydrate formed, essentially grown, in the crystallizers. The underflow and overflow volumes with different solid contents formed in the crystallizers of the first crystallizer cascade are mixed together after having been separately removed from the crystallizers and before being fed into the next following crystallizer and are then again separated into underflow and overflow volumes having a very high solids content and a very low solids content, respectively. According to a screen analysis, 88 to 92% of the particles of the crystals removed from the last crystallizer of the first crystallizer cascade, have a size above 45 microns.

Upon leaving the last crystallizer of the first crystallizer cascade, the underflow and overflow of the last crystallizer are combined to form a combined discharge. This combined discharge, which is an aluminum oxide hydrate suspension coming out of the last crystallizer of the first crystallizer cascade, is cooled, before entering into the second crystallizer cascade, to a temperature of 55° to 45° C., with heat exchangers or expansion coolers preferably being used as cooling assemblies. As in the first crystallizer cascade, crystal growth is predominant in the second crystallizer cascade as well, but at substantially lower temperatures and a lower A/C ratio. The addition of seed crystals to the cold cascade is not necessary.

According to the present invention, the cooled combined discharge from the first crystallizer cascade is stirred out in each crystallizer of the second crystallizer cascade, so that at least 80 volume percent, preferably 85 to 90 volume percent, of the fill volume of each crystallizer of the second crystallizer cascade exhibit a high solids content, which is removed as underflow, and the overflow of each crystallizer of the second crystallizer cascade, which comes from the remaining fill volume of each crystallizer, has a solids content of no more than 20 g/l, calculated as $Al_2O_3$. It is of particular advantage to operate in such a manner that the overflow of each crystallizer of the second crystallizer cascade contains solids of no more than 3 g/l.

One characteristic of this process step is that in the crystallizers of the second crystallizer cascade, there occurs exclusively an enlargement by way of crystal growth of the crystals coming from the first crystal cascade.

If the second crystallizer cascade operates at temperatures from 55° to 45° C. in the first crystallizer and at 55° to 45° C., preferably about 50° C., in the last crystallizer, periods of dwell of about 13 to 23 hours, preferably about 15 hours, are required for passage through the second crystallizer cascade.

In the lower part of the crystallizers of the second crystallizer cascade, the aluminum oxide hydrate concentration should be high. It may be between 300 and 900 g/l. Agglomeration can best be prevented if the lower phase, the "solids bed", takes up a large amount of space and has a high solids content. According to the present invention, the "solids bed" takes up about 80 to 85% by volume of the fill volume. The A/C ratio, which at the point of entry into the second crystallizer cascade should be between 0.430 and 0.380, preferably 0.420, is reduced at the point of exit from the last crystallizer of the second crystallizer cascade to between 0.350 and 0.320, preferably to between 0.320 to 0.330. The solids content in at least 80 volume percent of the suspension in the crystallizer of the second crystallizer cascade is preferably 600 to 700 g/l, expressed as aluminum oxide hydrate.

The total solid discharge quantity (underflow and overflow) from the last crystallizer of the second crystallizer cascade, is equal to the solid quantity that flows into the second crystallizer, to which is added the aluminum oxide hydrate formed, essentially grown, in the crystallizers of the second crystallizer cascade. The underflow and overflow volumes with different solid contents formed in the crystallizers of the second crystallizer cascade are mixed together after having been separately removed from the crystallizers and before being fed into the next following crystallizer and are then again separated into underflow and overflow volumes having a very high solids content and a very low solids content, respectively. The discharge temperature is given as 55° to 45° C., preferably 50° C. According to a screen analysis, 90 to 92% of the formed crystals removed from the last crystallizer of the second crystallizer cascade are larger than 45 microns.

In this connection, it must be pointed out that the above results can be realized only if any impurities possibly existing in the process liquor have previously been substantially removed. Purifications processes are known. They are disclosed, for example, in DE-PS No. 2,518,431 and other references. A suitable process liquor still contains approximately the following impurities:

(1) less than 0.05 g/l solid oxalates, expressed as sodium oxalate;
(2) less than 110 mg/l humic acid derivatives;
(3) less than 8 g/l long chain organic compounds, expressed as carbons;
(4) less than 4 g/l inorganic salts, expressed as $Na_2CO_3$; and
(5) less than 10% $Na_2CO_3$, with respect to the dissolved sodium hydroxide in the process liquor.

Upon leaving the last crystallizer of the second crystallizer cascade, the underflow and overflow of the last crystallizer are combined to form an withdrawn crystal suspension which is then subjected to fractionation to form fine seed crystals which can be recycled to the first agglomerator and coarse product crystals. If desired, the coarse product crystals can be further fractionated or classified in coarse seed and coarser product crystals. In such case the coarse seed shall be added to the first crystallizer of the first crystallizer cascade.

The present invention will now be explained in greater detail with the aid of two drawing figures.

FIG. 1 is a flow scheme for one embodiment of the process according to the present invention for producing stable and simultaneously coarse aluminum oxide hydrate crystals.

Figure 2:
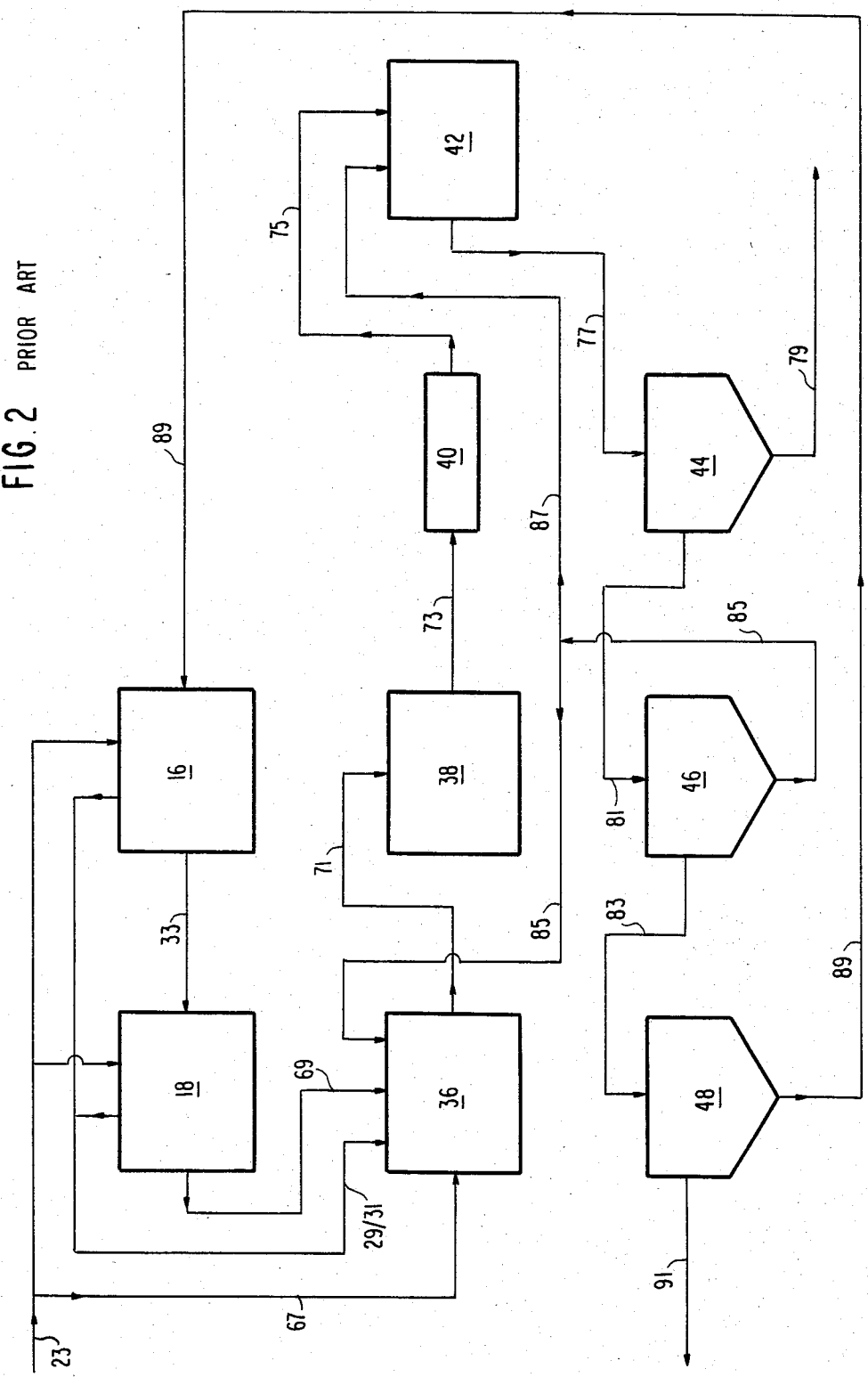
FIG. 2 is a flow scheme according to a prior art process for producing coarsely crystalline aluminum oxide hydrate.

FIG. 2 is a flow scheme according to the prior art for producing coarsely crystalline aluminum oxide hydrate which, however, exhibits only poor strength and is easily broken up in the calcining furnace.

The present invention is of course not limited to the embodiment illustrated in FIG. 1. For example, the number of agglomerators and crystallizers may also be smaller or larger.

Referring now to FIG. 1, hot, supersaturated mother liquor is introduced through a line 20 into the first agglomerator 1 of the "hot" cascade, which comprises, for example, five agglomerators 1 to 5.

With reference to FIG. 1, there will now be described a specific embodiment of the present invention.

A quantity of fine seed crystals is introduced into agglomerator 1 through a line 22 from a stir-out vessel 14 by means of a pump 15 in an amount of 20 g/l, calculated as $Al_2O_3$. While nucleation takes place only in agglomerators 1 and 2 at 78° C. and at an A/C ratio of 0.660, agglomerates are formed in the entire agglomerators chain, i.e. 40 g/l, so that the suspension leaving this cascade contains a total of 60 g solids per liter, expressed as $Al_2O_3$. When leaving the last agglomerator, the A/C ratio is 0.500, the sodium hydroxide liquor concentration is 250 g/l, expressed as $Na_2CO_3$.

The suspension leaves the last agglomerator 5 with the stated solids content, an A/C ratio of 0.500 and at a temperature of 70° C. and enters into crystallizer 6 to which crystallizer 7 is connected. Crystallizers 6 and 7 form the first crystallizer cascade which is the second hot cascade of the novel process of the present invention. In practice, the number of crystallizers in the first crystallizer will probably be larger. For the sake of simplicity, only two are discussed here. The period of dwell in the first crystallizer cascade is about 8 hours, and the quantity of aluminum oxide hydrate crystallized out is 20 g/l, expressed as $Al_2O_3$. The suspension leaving the first crystallizer cascade (second hot cascade) thus contains 80 g/l, calculated as $Al_2O_3$ and leaves at 65° C. At the end of the first crystallizer cascade, the A/C ratio has dropped to 0.420. Crystallizers 6 and 7 according to the present invention operate in such a manner that at least 80 volume percent of the fill volume have a high solids content and the remaining fill volume has a very low solids content. The solids content in the overflow should not be higher than 20 g/l, preferably no higher than 3 g/l.

After cooling the suspension to 55° C. in a heat exchanger 8, the sodium aluminate liquor is stirred out further in the second crystallizer cascade, also called the "cold" cascade. This cascade includes, for example, three crystallizers 9, 10 and 11. In practice, this number may vary. The combined discharge from crystallizer 11 has an A/C ratio of 0.340 and a temperature of 50° C. The solids content, expressed as $Al_2O_3$, is 100 g/l. Consequently, 20 g $Al_2O_3$ have also been formed in the cold cascade, a total of 80 g/l in all three cascades together. The period of dwell in the third cascade is at about 15 hours, the period of dwell in the second cascade is about 8 hours and in the first cascade, the period of dwell is about 7 hours. A total of 30 hours are thus required.

According to the present invention, the combined discharge from crystallizer 11 is separated in a two-stage process, whereby the coarse grained crystals are separated as product in a decanter 12, while the fine-grained crystals are taken from filter 13 as seed crystals and, after being mixed with process liquor in stir-out vessel 14, are returned to circulation through line 22. From decanter 12, 80 g are removed from the process as product. As already mentioned, only 8 to 10%, preferably 2 to 5%, of these crystals have a grain size less than 45 microns. After calcination, a coarse grained aluminum oxide is present whose crystals have been damaged only insignificantly during the calcination process.

The statements made in connection with the process illustrated in FIG. 1 indicate that 20 g fine seed material are required to produce 80 g coarse aluminum hydroxide, calculated as $Al_2O_3$. Thus, only 20 g/l of seed material returned to the process circulates through all three cascades. The circulating quantity of seed crystals is very small. Only 0.25 ton (20/80) of finely crystalline seed material are required to produce 1 ton of coarse aluminum oxide hydrate. As has been shown, this inoculation quantity may fluctuate within certain limits. Thus, good results are still obtained if 0.2 to 1.0 ton of fine seed material are used per ton of aluminum oxide produced.

If, according to a special embodiment of the present invention, medium coarse seed crystals are returned or sluiced into the process in the first crystallizer 6 of the first crystallizer cascade, the medium coarse seed crystals are employed with advantage in quantities of 100 to 300 g/l, calculated as $Al_2O_3$, preferably quantities of 150 to 170 g/l. 70 to 90% of the medium coarse seed crystals should be larger than 45 microns.

The flow scheme of FIG. 2 describes an embodiment of the process according to Canadian Pat. No. 1,098,284, which is comparable in several points with the process according to the present invention. Thus, this embodiment as well operates with three cascades and the suspension leaving the second cascade is cooled to a temperature of 65° to 50° C. before entering the third cascade. The significant difference between the two processes under comparison illustrated in FIGS. 1 and 2 is that in the process according to the present invention, agglomerators are used in the first cascade, while in the prior art process the first cascade employs three-phase stirrers. Another difference is that the stirrers in the second and third cascades in the novel process of the present invention are not three-phase stirrers, but crystallizers in which crystal growth takes place almost exclusively and in which at least 80 volume percent of the fill volume have a very high solids content.

In FIG. 2, hot, supersaturated mother liquor is fed in parallel through line 23 into three-phase stirrers 16 and 18 of the product cascade (first cascade) and seed crystals through line 89. The liquor concentration is about 200 to 300 g/l. The overflow, i.e. the partially stirred-out liquor from the stirrer of the product cascade is conducted through line 29/31 into the first stirrer 36 of the second cascade which is likewise constructed of a plurality of stirrers, e.g. eight to twelve. The drawing shows only the two stirrers 36 and 38, which may be three-phase stirrers. The first stirrer 36 of this cascade further receives, via a line 67 branching off from line 23, fresh (not yet stirred), hot mother liquor. Moreover, the crystal slurry obtained from the last stirrer 18 of the product cascade is introduced through line 69 into stirrer 36. These crystals have passed through series connected stirrers 16 and 18 of the product cascade, while the partially stirred-out liquors have been extracted in parallel from the stirrers. The solids concentration at the outlet of stirrer 18 is about 40 to about 65%. Through a line 85, medium coarse seed crystals are likewise introduced into stirrer 36 from the bottom of decanter 46. The suspension is now stirred further in stirrers 36 and 38. The total mass, i.e. the stirred-out liquor and the crystals suspended therein, are conducted through the series connected stirrers 36 and 38 of the cascade. These stirrers are connected together via a line 71. The liquor and the crystals leave the stirrer 38 through a line 73. The liquor/crystal mixture is conducted through heat exchanger 40 and is there cooled to a temperature about 65° to 50° C. Thereafter, the mixture is conducted through a line 75 into stirrer 42 which is the first stirrer of a further cascade or possibly the only stirrer. For the sake of simplicity, only one stirrer 42 is shown. If, however, a plurality of stirrers are connected in series in a cascade, the entire mass, i.e. liquor and crystals, are conducted through the series connected stirrers and extracted from the last stirrer. Moreover, via a line 85 and a line 87, medium coarse seed crystals are introduced into stirrers 42 and 36.

The mixture is stirred in stirrers 36, 38 and 42 and conducted through line 77 into the first decanter 44. From decanter 44, coarse crystals are extracted as product through line 79 while the overflow is introduced through line 81 into a second decanter. Medium coarse seed crystals are extracted from decanter 46 through line 85 and these are introduced, as already mentioned, into stirrers 36 and 42. The overflow from decanter 46 is introduced through line 83 into the third decanter 48. From decanter 48 fine seed crystals are extracted through line 89 and fed into the first stirrer 16 of the product cascade. The overflow of decanter 48 is returned through line 91 to the autoclave (bauxite decomposition). The temperature in the cascade formed of stirrers 36 and 38, as in the product cascade 16 and 18, is about 90° to 75° C., dropping from the upper to the lower value in the direction of flow. The temperature in stirrer 42 is approximately 65° to 50° C., preferably about 60° to 55° C. The quantity of seed crystals introduced into the first stirrer 16 of the product cascade is at about 30 to about 200 g/l. (Quantity or weight indications with respect to seed crystals and liquor refer to one liter of the total mixture.)

The A/C ratio of the mother liquor introduced into stirrer 16 is about 0.660, the NaOH content, calculated as $Na_2CO_3$, is 240 g/l and the content of aluminum oxide hydrate, calculated as $Al_2O_3$, is 157.4 g/l. The quantity of fine seed crystals fed into vessel 16 is 36 g/l. When leaving stirrer 18, the aluminum oxide hydrate concentration, calculated as $Al_2O_3$, is 121.4 g/l. Thus 36 g/l were produced in the product cascade. The partially stirred-out sodium aluminate solution which is fed into the first stirrer of the second cascade as 121.4 g/l $Al_2O_3$ leaves the last stirrer of that cascade with an $Al_2O_3$ content in g/l of 99.4 (A/C ratio=0.414). The stirred-out liquor leaving stirrer 42 of the third cascade has an aluminum oxide hydrate content of 77.4 g/l, calculated as $Al_2O_3$; it flows through line 77 into decanter 44. The A/C ratio is then 0.322. As a whole, the prior art process has also produced 80 g/l aluminum oxide hydrate crystals.

As has been shown, for an evaluation of the two processes under comparison, the quantity of aluminum hydrate crystals produced in grams per liter is without significance. The technological advance of the novel process of the present invention is evident from the shorter time required to produce the coarse crystals. The production time can be reduced by 30 to 40% of the time required in the process according to the Canadian patent. The Canadian process requires 60–80 hours retention time, while the new improved process requires a minimum of 33 hours and a maximum of 47 or preferably an average of 40 hours total retention time. Moreover, the quantity of circulating seed crystals can be reduced considerably so that smaller quantities are recirculated and the amount of apparatus required is less. Additionally, the crystals produced according to the novel process of the present invention are significantly more stable, which is a further important advantage of the novel process of the present invention.

The Canadian process as shown in FIG. 2 produced a product having a 35% breakdown in the fluidized calciner. The new process results in a product having only 7% breakdown while further improvement can be made by slightly altering the process parameters.

Seed crystals and mother liquor are added continuously to the first agglomerators. The agglomerators do not have an underflow, but overflows only; the agglomerators are homogeneously mixed and do not have a clarification zone and thickening zone. The overflow of the first agglomerator flows by gravity into the second (somewhat lower located) agglomerator and so on.

The underflow of each crystallizer is continuously pumped, after being mixed with its own overflow, to the following crystallizer and so on.

There is a continuous withdrawal of the underflow+overflow of the last crystallizer to the classification system (for seed and product). This flow about equals the flows entering the first agglomerator.

It will be understood that the above description of the present invention is susceptible to various modifications, changes and adaptations, and the same are intended to be comprehended within the meaning and range of equivalents of the appended claims.

What is claimed is:

1. Continuous process for the extraction of alumina hydrate from bauxite according to the Bayer process wherein a supersaturated sodium aluminate solution containing dissolved alumina hydrate is formed by wet decomposition of ground bauxite with sodium hydroxide and alumina hydrate is precipitated from the supersaturated sodium aluminate solution in coarse grained form in the presence of seed crystals, comprising:
   (a) introducing a suspension of fine seed crystals into the first agglomerator of a cascade of series connected agglomerators, conducting the supersaturated sodium aluminate solution which has been adjusted to have a sodium hydroxide concentration of 200 to 300 g/l, calculated as $Na_2CO_3$, through the cascade of series connected agglomerators at temperatures from 80° to 65° C. and precipitating part of the dissolved alumina hydrate from the supersaturated sodium aluminate solution to form agglomerates, with the first agglomerator having a solids content of 10 to 50 g/l, calculated as $Al_2O_3$;
   (b) thereafter conducting the sodium aluminate solution containing agglomerates from the last agglomerator through a first cascade of series connected crystallizers, with each crystallizer having an underflow and an overflow which comes from a clarification zone of each crystallizer, and precipitating part of the dissolved alumina hydrate in the first crystallizing cascade in such a manner that at least 80% of the fill volume of each crystallizer has a high solids content and the overflow, which comes from the clarification zone, has a solids content of no more than 20 g/l, with underflow being introduced into the next crystallizer of the first cascade only after being mixed together;
   (c) combining the underflow and overflow from the last crystallizer of the first crystallizer cascade to form a combined discharge and cooling the combined discharge to a temperature between 55° C. and 45° C.;
   (d) precipitating a part of the dissolved alumina hydrate in the cooled combined discharge in a second cascade of series connected crystallizers, with each crystallizer having an underflow and an overflow which comes from a clarification zone of each crystallizer, in such a manner that at least 80% of the fill volume of each crystallizer of the second cascade has a high solids content and the overflow, which comes from the clarification zone has a solids content of no more than 20 g/l, with underflow and overflow being introduced into the next crystallizer of the second cascade only after being mixed together; and
   (e) withdrawing and combining the underflow and overflow of the last crystallizer of the second crystallizer cascade into a crystal suspension of alumina hydrate solids, and fractionating the withdrawn crystal suspension into fine seed crystals and coarse product crystals.

2. Process as defined in claim 1, wherein the overflow of the clarification zone of each crystallizer of the first cascade has a solids content of no more than 3 g/l.

3. Process as defined in claim 1, wherein the overflow of the clarification zone of each crystallizer of the second cascade has a solids content of no more than 3 g/l.

4. Process as defined in claim 1, wherein the fine seed crystals in the agglomerator cascade are used in quantities from 10 to 50 g/l, calculated as $Al_2O_3$, and 25 to 60% of the crystals, have a particle size below 45 microns.

5. Process as defined in claim 4, wherein 35 to 45% of the fine seed crystals have a particle size below 45 microns.

6. Process as defined in claim 4, wherein the fine seed crystals are used in quantities of 15 to 25 g/l, calculated as $Al_2O_3$.

7. Process as defined in claim 1, wherein the sodium aluminate solution passes through the agglomerator cascade in 6 to 10 hours.

8. Process as defined in claim 1, wherein the sodium aluminate solution passes through the agglomerator cascade at a temperature of 78° to 75° C.

9. Process as defined in claim 1, wherein the sodium aluminate solution passes through the cascade with an A/C ratio of 0.700 to 0.650 in the first agglomerator and 0.550 to 0.450 in the last agglomerator.

10. Process as defined in claim 1, wherein the discharge from the agglomerator cascade passes through the first crystallizer cascade at temperatures of 70° to 62° C.

11. Process as defined in claim 1, wherein the discharge from the agglomerator cascade passes through the first crystallizer cascade in 7 to 14 hours.

12. Process as defined in claim 1, wherein the sodium aluminate solution in the combined discharge of the first crystallizer cascade has an A/C ratio of 0.420 to 0.380.

13. Process as defined in claim 1, wherein at least 80% of the fill volume of each crystallizer contains a solids content of 150 to 900 g/l, calculated as aluminum oxide hydrate.

14. Process as defined in claim 13, wherein at least 80% of the fill volume of the crystallizers in the second crystallizer cascade are passed with a solids content of 600 to 700 g/l, calculated as aluminium oxide hydrate.

15. Process as defined in claims 1, wherein the combined discharge from the last crystallizer of the first crystallizer cascade is cooled in a heat exchanger.

16. Process as defined in claim 1, wherein the cooled and combined discharge of the first crystallizer cascade passes through the series connected second cascade of crystallizers in 13 to 23 hours.

17. Process as defined in claim 1, wherein the sodium aluminate solution in the combined discharge of the second crystallizer cascade has an A/C ratio of 0.350 to 0.320.

18. Process as defined in claim 1, wherein medium coarse seed crystals are fed into the first crystallizer of the first crystallizer cascade, where the first crystallizer has a solids content of between 150 and 450 g/l, expressed as aluminum oxide hydrate.

19. Process as defined in claim 18, wherein medium coarse seed crystals are fed into the first crystallizer of the first crystallizer cascade in quantities of 150 to 170 g/l, calculated as $Al_2O_3$.

20. Process as defined in claim 18, wherein medium coarse seed crystals are used of which 70 to 90% are larger than 45 microns.

21. Process as defined in claim 19, wherein medium coarse crystals are used of which 70 to 90% are larger than 45 microns.

22. Process as defined in claim 1, wherein no medium coarse seed is added to the first crystallizer of the first crystallizer cascade.

23. Process as defined in claim 1, wherein in step (e), the crystal suspension is fractionated into fine seed crystals, medium coarse seed crystals and coarse product crystals.

24. Process as defined in claim 1, wherein the sodium aluminate solution containing agglomerates is conducted through the first cascade of series connected crystallizers in 7 to 14 hours, with each crystallizer having an overflow by gravity, and wherein the solids of each crystallizer are homogeneously mixed.

25. Process as defined in claim 1, wherein the solids content in at least 80% of the fill volume of each crystallizer of the first cascade is 230 to 260 g/l, expressed as aluminum oxide hydrate.

* * * * *